Mar. 6, 1923.

M. W. MARSDEN

THEFT DETECTING DEVICE

Filed Oct. 24, 1921

1,447,802

3 sheets-sheet 1

WITNESSES:
Lynn Brodton
Augustus B. Coppes

INVENTOR
Mark W. Marsden
By Joshua R. H. Potts
ATTORNEY

Mar. 6, 1923.
M. W. MARSDEN
THEFT DETECTING DEVICE
Filed Oct. 24, 1921
1,447,802
3 sheets-sheet 2
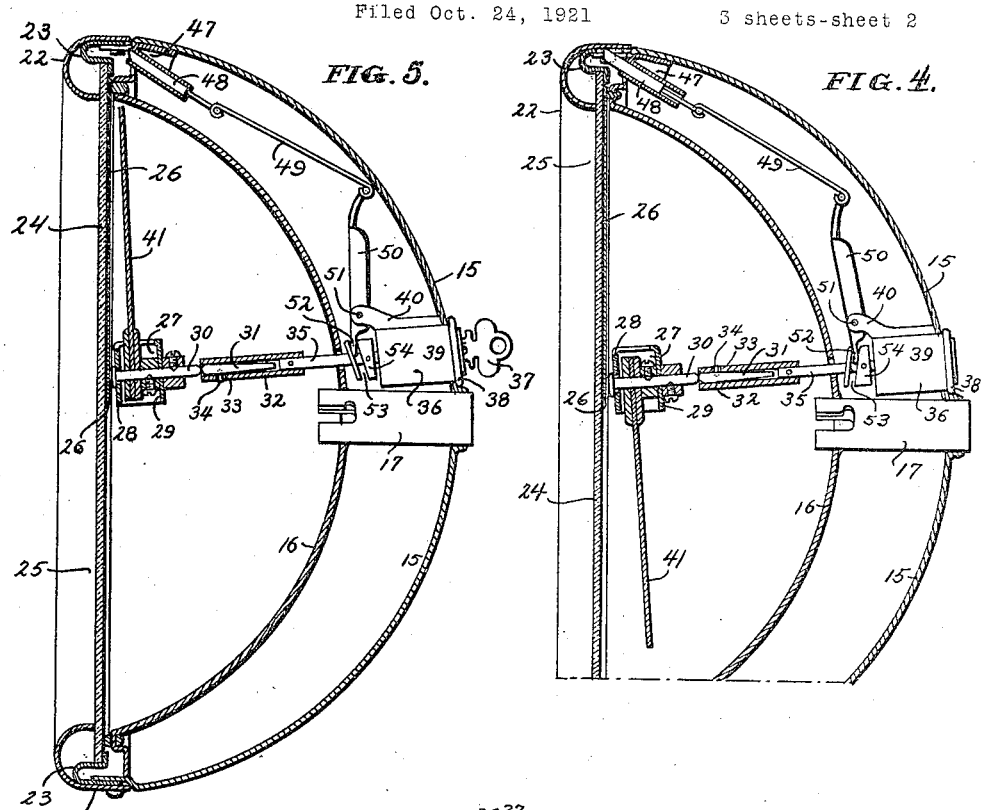
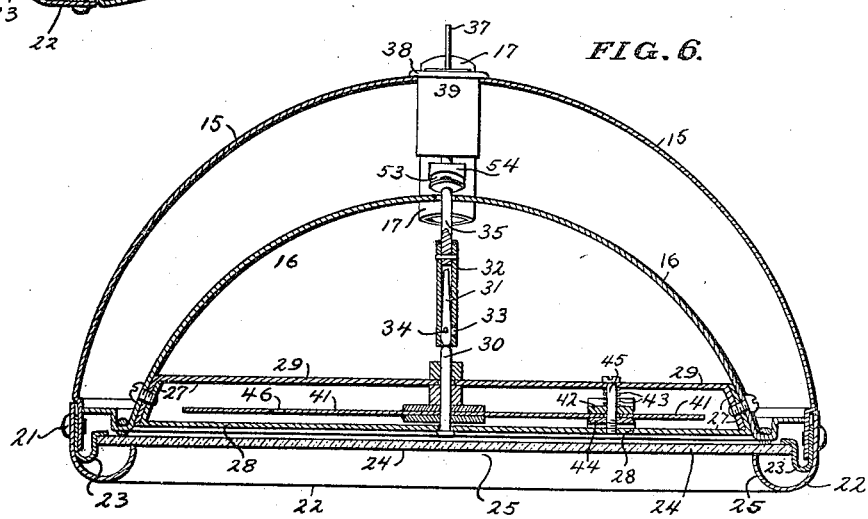
WITNESSES:
Lynn Brodton
Augustus B. Coppes
INVENTOR
Mark W. Marsden
By Joshua R. H. Potts
ATTORNEY

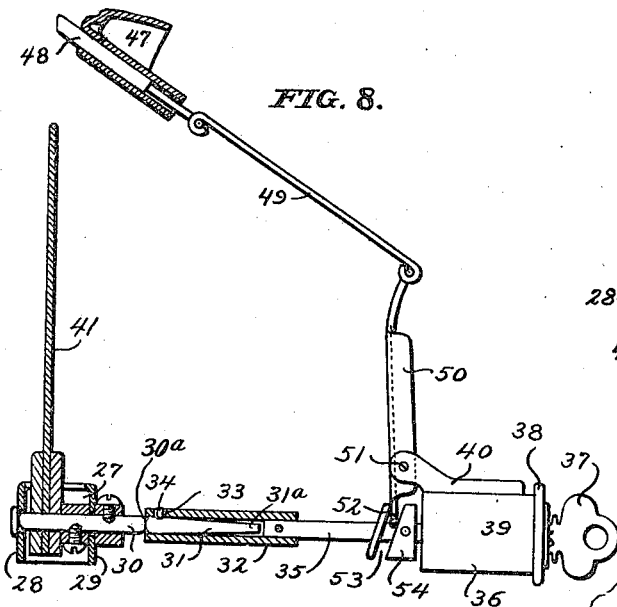
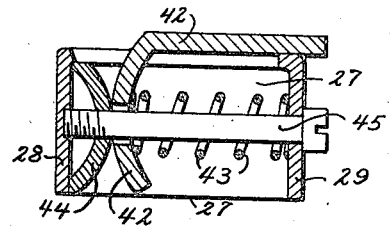
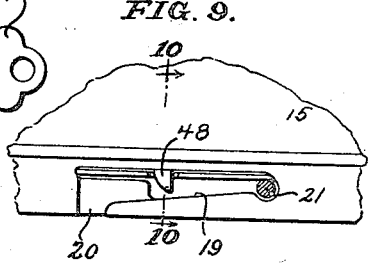
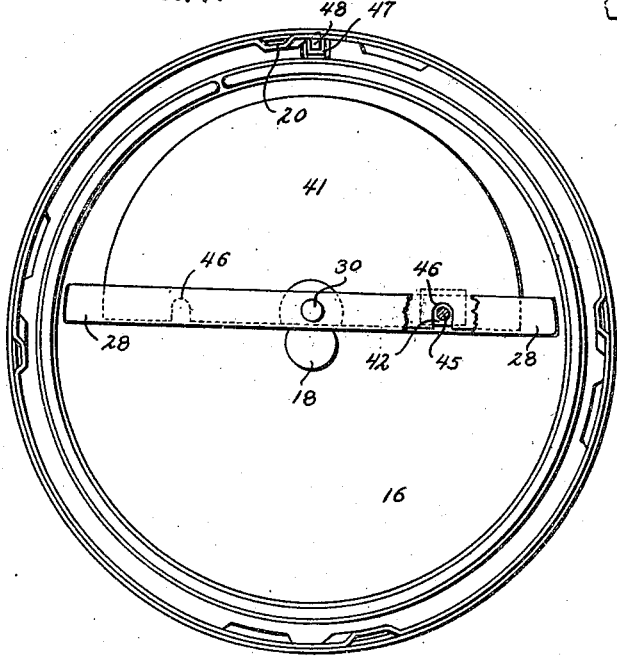
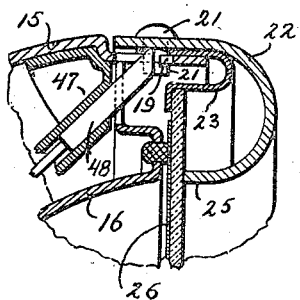
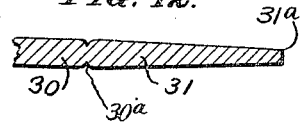

Patented Mar. 6, 1923.

1,447,802

UNITED STATES PATENT OFFICE.

MARK W. MARSDEN, OF PHILADELPHIA, PENNSYLVANIA.

THEFT-DETECTING DEVICE.

Application filed October 24, 1921. Serial No. 509,893.

*To all whom it may concern:*

Be it known that I, MARK W. MARSDEN, a citizen of the United States, residing at Philadelphia, in the county of Philadelphia and State of Pennsylvania, have invented certain new and useful Improvements in Theft-Detecting Devices, of which the following is a specification.

One object of my invention is to provide improved means embodied in an automobile lamp casing and which is of such character that when set in a certain position it will notify anyone looking at the lamp that if the automobile is in motion it is being driven by a thief or unauthorized person.

Another object is to so construct my improved device that it cannot be tampered with by an unauthorized person but can be readily moved into and out of operative position by the owner of the automobile or other authorized person.

A further object is to make my improved device of a durable and comparatively simple construction which can be readily maufactured.

These objects, and other advantageous ends which will be described hereinafter, I attain in the following manner, reference being had to the accompanying drawings in which—

Figure 1:
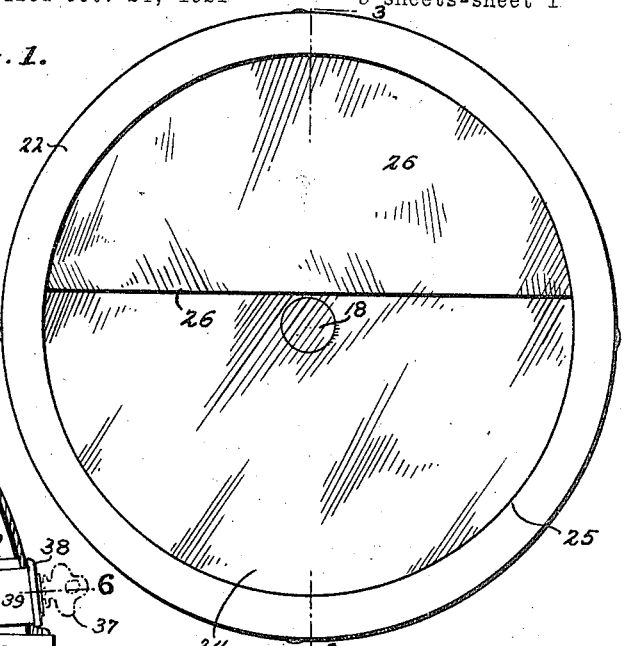
Figure 3:
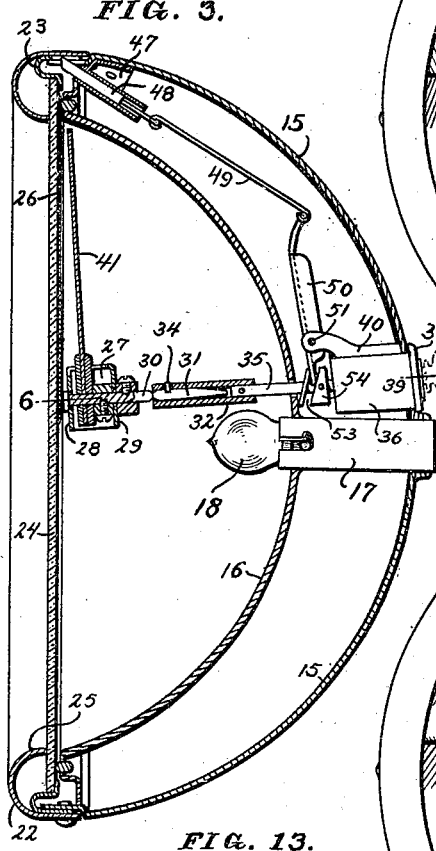
Figure 2:
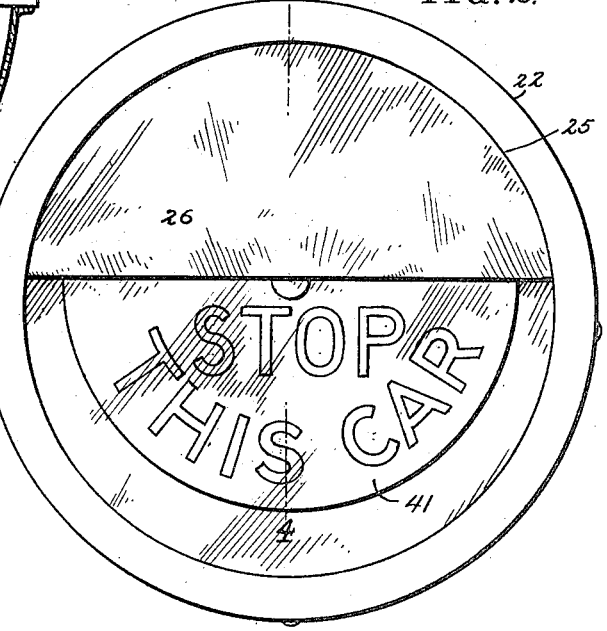
Figure 13:
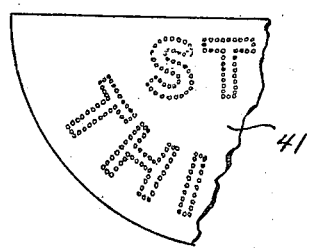

Figure 1 is a face view of a headlight lamp casing for automobiles which includes my invention; the parts of the invention being in such position as not to be noticeable so that an automobile having the device thereon in said position can be driven by an authorized person, Figure 2 is a view of the same general character as that shown in Figure 1, illustrating the parts moved into a position and locked in said position so as to obscure the light and reveal a sign which will show that if the automobile is in motion it is being driven by an unauthorized person, Figure 3 is a section taken on the line 3—3 of Figure 1, Figure 4 is a section taken on the line 4—4 of Figure 2, Figure 5 is a view of the same general character as that shown in Figure 3 showing certain of the parts moved into a position to withdraw a bolt from its locking position so as to permit the front of the casing to be removed, Figure 6 is a section taken on the line 6—6 of Figure 3, Figure 7 is a front view with the rim and glass removed, Figure 8 is a sectional view showing the movable parts of the device detached from the lamp casing, Figure 9 is a fragmentary view of a portion of the casing illustrating the position of the locking bolt relatively to the connecting lugs between the rim and the body of the casing, Figure 10 is an enlarged fragmentary section, showing certain of the features of my invention, taken on the line 10—10 of Figure 9, Figure 11 is an enlarged sectional view of a friction-retaining means for the movable sign, Figure 12 is a fragmentary sectional view of the sign connecting spindle which forms a part of my invention, and Figure 13 is a fragmentary view of a sign of a slightly different form from that disclosed in the above mentioned figures of drawing.

Referring to the drawings and particularly to Figures 1 to 12 inclusive, 15 represents the body portion of a lamp casing which is made in the form of a shell and includes a reflector 16. A socket 17 extends through the shell 15 and reflector 16 and serves to support an electric lamp bulb 18 which serves as a source of light for the lamp and may be connected by any suitable wires through the medium of the socket. The outer edge portion of the shell 15 is depressed and provided with a number of bayonet slots 19 having entrance depressions 20 for lugs 21 on a rim 22; said rim having clips 23 secured at spaced distances apart on its inner surface for engagement with the edge and rear surface of a front or closing glass cover 24. The rim has an inturned flange portion 25 for engaging the outer surface of the glass cover. The lugs 21 can be permanently secured to the rim by riveting them on opposite sides or by brazing or welding the same to the rim. The upper section of the glass cover 24 is preferably made opaque by painting the glass cover as shown at 26; said opaque portion forming a shield to obscure a sign as will hereinafter be described. A bridge or transverse support 27 has its opposite ends secured to the reflector 16; said bridge having front and rear rails 28 and 29 which are spaced apart.

A spindle 30 has a bearing in the bridge 27; said spindle having an annular groove 30ª and also having a tapered portion 31 extending from the groove 30ª to the end 31ª. The tapered portion 31 is located within a sleeve 32 with the groove 30ª adjacent one end of the sleeve 32 for a purpose hereinafter described. This sleeve has a slot 33 extending partway around the same. A pin 34 in the tapered portion 31 of the spindle 30 extends into the slot 33. A shaft 35 is secured to the sleeve 32; said shaft being connected to the operative means within a selective lock casing 36 which is secured to the body portion 15 of the casing; a part of said lock casing extending between the shell 15 and the rear of the reflector 16. The rear end of the lock casing extends outside of the shell 15 and provides a key hole in which a key 37 can be inserted. The lock casing 36 is preferably provided with a flange 38 which is larger than the hole through which the barrel portion 39 of the lock extends and a bracket 40 is secured to the barrel portion 39 within the lamp casing so that the lock casing cannot be moved inward or outward.

A sign 41 is secured to the spindle 30 between the rails 28 and 29 of the bridge 27 and said sign, as shown in Figure 2, can have any suitable wording thereon, such for example as "Stop this car." The sign is preferably made of opaque material so that when moved downward so as to be positioned below the lower edge of the opaque shield 26 that it will prevent view of the lamp 18 and will also keep the major portion of the rays of light, emanating from said source of light, from passing out through the glass cover. It will be understood that by inserting the key 37 within the lock casing and turning the key that the shaft 35 will be rotated and the sign 41 can be swung from a position in back of the opaque shield 26 to a position in front of the lamp 18 and so as to be visible through the clear portion of the glass cover and when the key 37 is removed that the sign will remain in said lower position and cannot be turned until the proper key is again inserted.

A friction-retaining device as shown in Figure 11 is secured to the bridge and includes a curved finger 42 which is backed by a spring 43; said spring 43 being adapted to move the finger 42 against a curved abutting member 44. Thus when the sign 41 is moved from its upper to its lower position one edge of the sign will move between the finger 42 and abutting member 44 and the resilient characteristic of the spring 43 will tend to frictionally hold the sign and prevent accidental shaking movement. It will be noted that the finger 42 and actuating member 44 are held in place by a screw 45 which passes through the rails 28 and 29 of the bridge 27; said screw also serving as a support for the spring. The sign preferably includes notches 46 as shown in Figure 7 so as to allow the edge portion of the sign to pass a sufficient distance between the abutting member 44 and finger 42 to hold the sign against vibration.

As a means for preventing the removal of the rim 22, I provide the inner portion of the shell 15 with a housing 47 forming a slideway for a bolt 48; said bolt being so positioned that it can be projected into one of the bayonet slots 19 between the inner end of said slot and the entrance 20 as clearly shown in Figures 9 and 10. This bolt 48 is connected by a link 49 with a lever 50; the lever being pivotally mounted at 51 on the bracket 40. The end 52 of the lever 50 engages within a slot 53 in a cam 54 which is secured to the shaft 35; the cam slot being arranged at a slant to the axis of the shaft 35. Thus during a movement of the shaft 35 by the key 37 the lever 50 will be swung so as to withdraw the bolt 48 from out of the bayonet slot 19. The rim then can be moved circumferentially so that the lugs will register with the entrance openings 20 and the entire rim and glass cover can be removed. However, when the bolt 48 is projected into the bayonet slot 19 it will serve as a barrier to prevent the lug 21 from passing from the inner end to the entrance opening 20 and therefore the rim cannot be removed from the body portion 15. Figure 5 shows the parts in a position in which the bolt 48 is withdrawn and owing to the arrangement of the pin 34 and slot 33 the sign will not be moved until the end of the slot engages the pin 34 and this action will require a movement of the key to a greater extent than that necessary to effect the withdrawal of the bolt 48. In other words, in turning the key when in the position shown in Figure 3, the first part of the movement will effect the withdrawing of the bolt and a continued movement will cause the bolt to again be projected into its locking position with the rim and the sign 41 will be moved from the position shown in Figure 3 to the position shown in Figure 4. Thus the arrangement in order to move the sign requires a complete revolution of the key and during this complete revolution the bolt 48 will be withdrawn and again projected into locking position. Thus if it is only desired to unlock the rim from the body portion it is only necessary to impart a half revolution of the key.

By providing the tapered portion 31 of the spindle, the spindle can slightly rock within the sleeve 32 and for this reason, I am enabled to assemble the parts without requiring any extremely accurate alignments between the bearings for the spindle in the bridge and the position of the lock casing within the shell 15 since it will be readily understood that even if the bearings in the bridge are slightly out of alignment with the lock casing that the device will operate without any difficulty.

If desired, as shown in Figure 13, the sign can be perforated to form the words and in this latter arrangement a streak of light will pass outward through the perforations so that the wording of the sign will be clearly visible at night.

With my improved device if a person attempts to run the automobile with the lamp thereon and the sign in its lowered position, the same will be readily detected for the reason in the first place that the light will be cut off and the driver will be stopped by a police officer if only for the reason that there is no light, or practically no light, passing out of the lamp casing. If the sign is perforated as shown in Figure 13 the police officer or other person can by reading the same note that the automobile is being driven by an unauthorized person and can arrest the person. In the daytime the mere fact that the sign is in a position capable of being clearly read will also lead to the stopping of the automobile and the driver can be arrested.

With my improved construction, it will be noted that the sign can be moved through the medium of the selective locking means into and out of operative position so that it is not necessary to insert or remove a sign and furthermore the sign will be locked within the casing due to the action of the bolt 48.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a casing having a transparent portion; a sign within the casing, said casing having parts movable relatively to each other to provide an opening allowing access to said sign; and selectively operative means adapted when actuated to effect the locking of said casing parts together and to move said sign from one position to another within the casing; substantially as described.

2. A device of the character described including a casing; a sign within said casing, said casing having parts movable relatively to each other to provide an opening allowing access to said sign; means for locking said parts together; selectively operative means having a portion accessible from the outside of said casing; and means in operative connection with said selectively operative means and with said locking means and with said sign whereby the sign and locking means can both be movable through the medium of said selectively operative means; substantially as described.

3. A device of the character described including a casing; a sign pivotally mounted within said casing; selective means secured to said casing and having a part exposed to the outside of said casing whereby the selective means can be operated; means connecting said selective means with said sign whereby when the selective means is operated the sign can be swung on its pivot, said connecting means including a sleeve and an operatively connected spindle within said sleeve, said spindle being constructed so as to be capable of moving slightly out of axial alignment with said sleeve; substantially as described.

4. A device of the character described including a casing; a sign within said casing, said casing having parts movable relatively to each other to provide an opening allowing access to said sign; means for locking said parts together; selectively operative means secured to said casing; and means connecting said selectively operative means with said locking means and with said sign whereby the sign and locking means can both be movable through the medium of said selectively operative means; substantially as described.

5. A device of the character described including a casing; a sign within the casing, said casing having parts movable relatively to each other to provide an opening allowing access to said sign; a bolt for locking said parts together; selectively operative means secured to said casing; a cam operative through the medium of said selectively operative means; and means connecting said bolt and having a portion adapted to be engaged by said cam whereby when the selectively operative means is actuated the bolt will be moved into and out of locking position; substantially as described.

6. A device of the character described including a casing; a sign within the casing, said casing having parts movable relatively to each other to provide an opening allowing access to said sign; a bolt for locking said parts together; selectively operative means secured to said casing; a cam operative through the medium of said selectively operative means; means connecting said bolt and having a portion adapted to be engaged by said cam whereby when the selectively operative means is actuated the bolt will be moved into and out of locking position; and means connecting said selectively operative means with said sign; substantially as described.

7. A device of the character described including a casing; a sign within the casing, said casing having parts movable relatively to each other to provide an opening allowing access to said sign; a bolt for locking said parts together; selectively operative means secured to said casing; a cam operative through the medium of said selectively operative means; means connecting said bolt and having a portion adapted to be engaged by said cam whereby when the selectively operative means is actuated the bolt will be moved into and out of locking position; and means connecting said selectively operative means with said sign; said latter connecting means including a pin-and-slot connection whereby the selectively operative means can be moved a predetermined distance prior to effecting movement of the sign; substantially as described.

8. A device of the character described including a casing; a sign within said casing; resiliently pressed means within said casing for frictionally squeezing opposite sides of said sign; and means for moving said sign so as to engage said resiliently pressed means and prevent vibration of said sign; substantially as described.

In testimony whereof I have signed my name to this specification in the presence of two subscribing witnesses.

MARK W. MARSDEN.

Witnesses:
E. W. STRAIN,
ELIZABETH GARBE.